United States Patent [19]

Lang et al.

[11] Patent Number: 5,040,631
[45] Date of Patent: Aug. 20, 1991

[54] RACK AND PINION AUXILIARY STEERING MECHANISM, ESPECIALLY FOR MOTOR VEHICLES

[75] Inventors: Armin Lang, Schwäbisch; Helmut Knödler, Lorch, both of Fed. Rep. of Germany

[73] Assignee: Zahnradfabrik Friedrichshafen, AG., Friedrichshafen, Fed. Rep. of Germany

[21] Appl. No.: 445,722

[22] PCT Filed: Jun. 25, 1988

[86] PCT No.: PCT/EP88/00563
§ 371 Date: Nov. 27, 1989
§ 102(e) Date: Nov. 27, 1989

[87] PCT Pub. No.: WO89/00124
PCT Pub. Date: Jan. 12, 1989

[30] Foreign Application Priority Data

Jul. 3, 1987 [DE] Fed. Rep. of Germany ....... 3722058

[51] Int. Cl.$^5$ .............................................. B62D 5/04
[52] U.S. Cl. ..................................... 180/142; 180/147; 180/79.1
[58] Field of Search ...................... 180/79.1, 141, 142, 180/147, 148; 74/388 PS

[56] References Cited

U.S. PATENT DOCUMENTS

| D. 296,798 | 7/1988 | Smith | D21/23 |
|---|---|---|---|
| 2,313,473 | 3/1943 | Heacock et al. | 273/241 |
| 3,464,701 | 9/1969 | Mahoney | 273/271 |
| 3,684,285 | 8/1972 | Kane | 273/241 |
| 3,879,040 | 4/1975 | Smith | 273/271 |
| 3,884,474 | 5/1975 | Harper | 273/241 |
| 3,888,487 | 6/1975 | Replogle | 273/271 |
| 4,811,813 | 3/1989 | Hovanchak | 180/79.1 |
| 4,913,249 | 4/1990 | Lang | 180/141 |

FOREIGN PATENT DOCUMENTS

| 667737 | 5/1952 | United Kingdom | 273/241 |
|---|---|---|---|
| 1283840 | 8/1972 | United Kingdom | 273/241 |
| 2198098 | 6/1988 | United Kingdom | 180/79.1 |

OTHER PUBLICATIONS

"Original Plato Game", Creative Playthings Catalog, p. 73, 1969.

Primary Examiner—Charles A. Marmor
Assistant Examiner—Victor E. Johnson
Attorney, Agent, or Firm—Albert M. Zalkind

[57] ABSTRACT

In an electrically-assisted rack and pinion auxilliary steering mechanism, an electric motor is controlled in accordance with a signal from a torque-measuring device. To prevent faulty control messages, a safety switching device is provided that contains two switches capable of being activated by a lever. A ball nut that is connected with a threaded spindle by a ball diversion channel is connected with the steering rack of the rack and pinion steering gear. The threaded spindle is connected via a spring bellows, with an output part of a coupling that can be coupled with or uncoupled from the electric motor. The threaded spindle is connected, axially movable and rotatable, opposite the fixed housing by two elastic intermediate rings and two axial bearings. If the axial movement does not coincide with the torque at the steering wheel in case of a malfunction, the coupling is disengaged by one of the two switches.

5 Claims, 2 Drawing Sheets

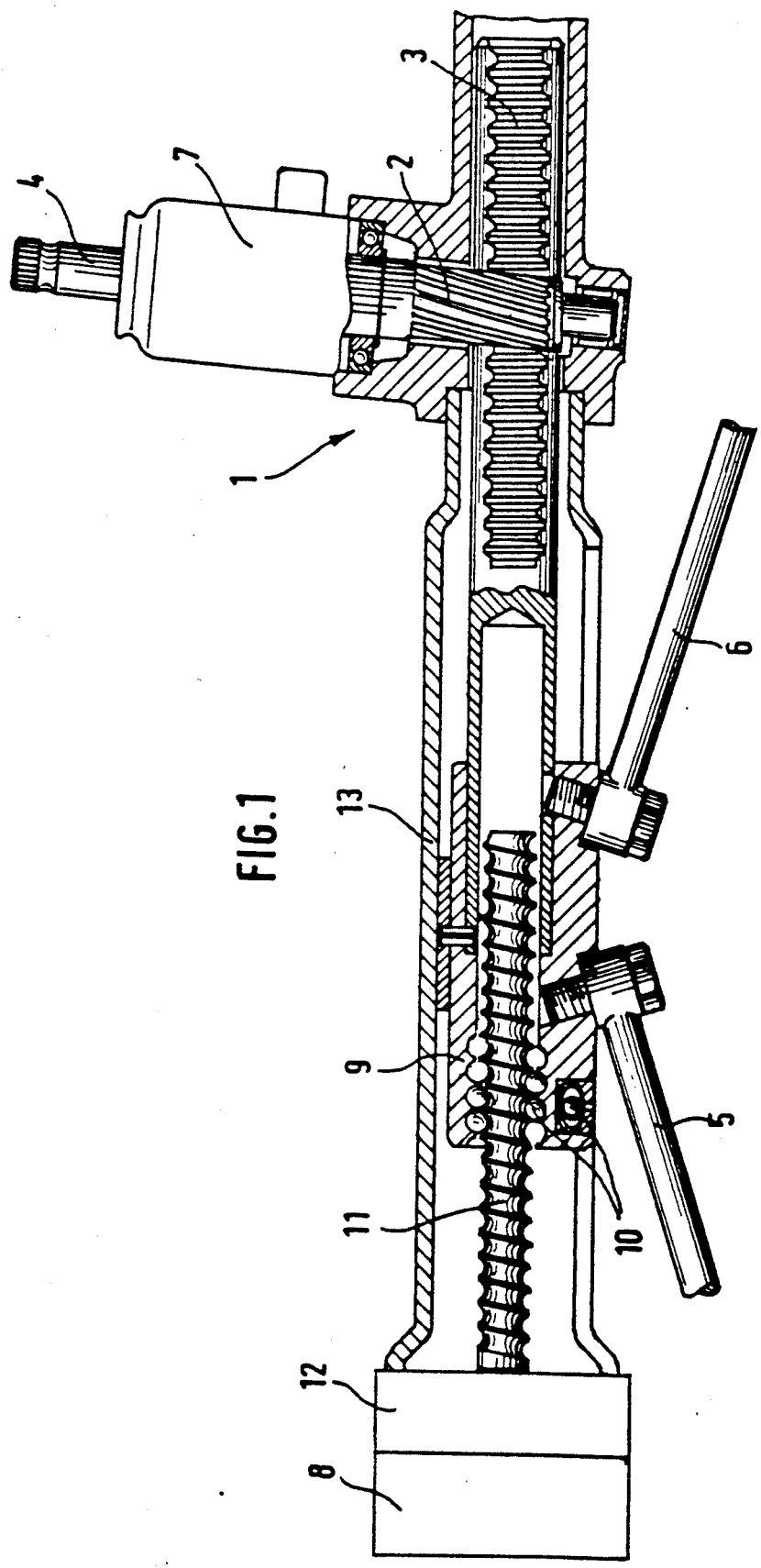

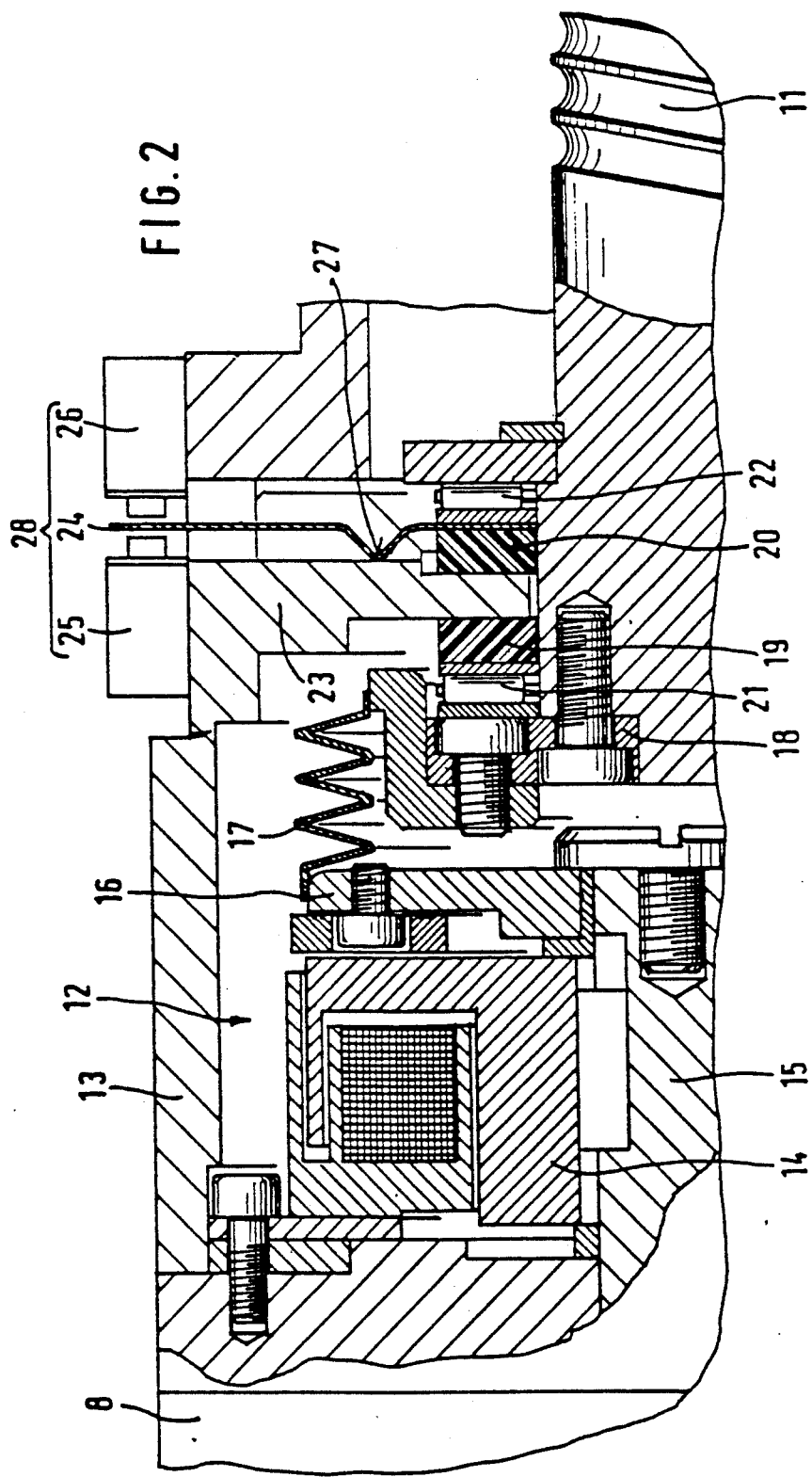

5,040,631

RACK AND PINION AUXILIARY STEERING MECHANISM, ESPECIALLY FOR MOTOR VEHICLES

BACKGROUND OF THE INVENTION

The present invention relates to electrically operated booster rack and pinion steering mechanisms of the kind known in the art as set forth, for example, in International patent number PCT/EP 88/00563.

As disclosed in such prior art, an electric motor drives a rack to operate a steering mechanism. The arrangement provides a safety switch which is normally engaged but which disengages in response to a signal in an electrical control circuit or a redundant safety circuit. However, the signal might be erroneous which could result in malfunctioning of the steering mechanism.

SUMMARY OF THE INVENTION

In the present invention, the electric motor is controlled in response to a signal from a torque sensor, i.e. a torque measuring device. Erroneous signals are prevented by a switching device wherein a coupling is normally in engagement with the motor for rotational drive of an axial shiftable threaded spindle drive for the rack by a ball nut connection.

In the event that the torque applied by the driver at the steering wheel does not correlate with a no torque condition of the pinion, shift of the spindle occurs in response to a control circuit due to a steering malfunction. The coupling is opened for disengagement by operation of the switch. The coupling from the motor to the spindle comprises a flexible corrugated bellows to transmit torque from the motor to the spindle for axial shifting and also to compensate the errors in alignment of the train from the motor to the steering rack.

BRIEF DESCRIPTION OF THE FIGURES

Other objects and advantages of the invention will become apparent from a study of the following specification when viewed in the light of the accompanying drawing, in which:

FIG. 1 is a diagrammatic representation of the rack and pinion auxiliary steering mechanism according to the invention; and FIG. 2 is a partial section through the safety switching device of the auxiliary steering mechanism according to FIG. 1, on an enlarged scale.

DETAILED DESCRIPTION

The mechanical part of the rack and pinion auxiliary steering mechanism shown in FIG. 1 comprises a rack and pinion steering gear 1 whose primary part is formed by a pinion 2 and whose secondary part is formed by a steering rack 3. The pinion 2 is connected with a steering wheel (not shown) by a steering shaft connection 4. The steering rack 3 is connected with the vehicle wheels to be steered by steering linkages 5, 6 as is known in the art.

A torque measuring device 7 is installed between the steering shaft connector 4 and the pinion 2. The torque measuring device 7 determines the relative torque between the steering shaft connection 4 and the pinion 2 and controls the driving of an electric motor 8 by an electronic module (not shown).

A ball nut 9 is connected with the steering rack 3 but does not rotate therewith. The ball nut 9 is connected, in driving union, with a threaded spindle 11 by a ball circulating channel 10. The threaded spindle 11 is connected with the electric motor 8 by a coupling or clutch 12 such as an electromagnetic solenoid that is shown only diagrammatically in FIG. 1. The pinion 2, the steering rack 3, the ball nut 9, the coupling 12 and the parts lying therebetween are surrounded by a multipart housing 13.

Referring now to FIG. 2, a drive member or rotor 14 of the coupling 12 is connected with the output shaft 15 of the electric motor 8. However, the drive member 14 does not rotate with the motor shaft 15. An output 16 of the coupling 12 is connected with a flange 18 fastened to the threaded spindle 11 by a spring bellows 17.

The threaded spindle 11 is resiliently supported for axial and rotational movement opposite a bottom plate 23 of the fixed housing 13 by two precompressed elastic intermediate rings 19 and 20 and two axial bearings 21 and 22.

Attached to the threaded spindle 11 is a lever 24 that is axially movable but not rotatable with the spindle. The lever 24 is clamped between one elastic intermediate ring 20 and one axial bearing 22 and held opposite the fixed housing 13. Attached to the housing 13 are two switches 25 and 26 that are capable of being activated by the free end of the lever 24. The lever 24 is provided with a bent section which always engages the bottom plate 23 of the housing to enlarge the adjustment path at the free end of the lever 24. A safety switching device 28 is formed by the two switches 25 and 26 and the lever 24.

OPERATION

The operation of the rack and pinion auxiliary steering mechanism with the safety switching device will now be described. If a torque rotating to the right is initiated by a rotation of the steering wheel (not shown) at the steering shaft connection 4, for example, it is transmitted to the vehicle wheels to be steered by the pinion 2, the steering rack 3 and the steering linkage 5, 6. The torque measuring device 7 registers a corresponding torque that is processed by an electronic module (not shown) which drives the electric motor 8 in a steering to the right direction. Accordingly, the pinion 2 is relieved of torque and the threaded spindle 11 is displaced axially to the right. As a result, the axial bearing 21 is pressed against the elastic intermediate ring 19 which is compressed in accordance with the axial force exerted by the threaded spindle 11. When that happens, the other elastic intermediate ring 20 expands. The clamped end of the lever 24 moves in unison with the threaded spindle 11, so that the free end of the lever 24 is pressed in the opposite direction to open the switch 25. The servoelectric support is not interrupted by the positive interruption of the dead switch 26. The desired reduction of the torque at the steering shaft connection 4 is provided by the servoelectric support. In normal operation in the neutral position of the steering wheel, the switches are energized and the coupling 12 is engaged.

However, if a torque is generated at the output shaft 15 of the electric motor 8, and consequently at the threaded spindle 11, whose rotation does not coincide with the torque initiated at the steering shaft connection 4 owing to a false or erroneous signal from the torque-measuring device 7, the threaded spindle 11 moves in an axial direction to the left. The coupling 12 thus becomes safely disengaged because of the interruption of the current-carrying switch 26. The electric motor 8 is therefore disconnected from the propulsion connection with the steering rack. As a result, malfunctioning of the rack and pinion auxiliary steering mechanism is immediately prevented.

We claim:

1. In a rack and pinion auxiliary steering mechanism for motor vehicles including a pinion (2) connected with a manually operable steering shaft and arranged in a housing (13) and meshing with teeth of a steering rack (3), and further including an electric motor (8) for assisting the movement of the steering rack via means (12) for engaging and disengaging the motor under control of a safety switching mechanism (28) when torque initiated by the electric motor does not coincide with torque initiated at the steering shaft as sensed by a torque measuring device (7), the improvement which comprises (a) a ball nut (9) connected with said rack (3);
   (b) a threaded spindle (11) connected with said ball nut via a ball circulating channel (10), said spindle being supported for axial and rotation movement within said housing;
   (c) said safety switching mechanism sensing the axial position of said spindle; and
   (d) said motor engaging and disengaging means comprising a coupling (12) arranged between said motor and said spindle.

2. A rack and pinion auxiliary steering mechanism as defined in claim 1, wherein said coupling includes an output member (16) connected with said spindle via a bellows (17) to provide axial movement while preventing rotational movement therebetween, and further comprising elastic intermediate rings (19, 20) and axial bearings (21, 22) for supporting said spindle within said housing.

3. A rack and pinion auxiliary steering mechanism as defined in claim 2, wherein said safety switching device includes a lever (24) having a first end clamped between one of said rings and one of said bearings for axial movement with said spindle, said lever having a second end extending toward said housing between a pair of switches (25,26) connected with said housing, said switches being activated by said lever second end upon axial movement of said spindle to disengage said coupling.

4. A rack and pinion auxiliary steering mechanism as defined in claim 3, wherein said lever comprises a spring lever including a bent section (27) supported by said housing.

5. A rack and pinion auxiliary steering mechanism as defined in claim 2, wherein said elastic rings are installed with precompression.

* * * * *